US008785533B2

(12) United States Patent
Chamberlain et al.

(10) Patent No.: US 8,785,533 B2
(45) Date of Patent: Jul. 22, 2014

(54) ARCHITECTURAL PAINT FOR COVERING DEFECTS

(75) Inventors: Richard Randall Chamberlain, Solon, OH (US); Rasna Batra, Twinsburg, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 48 days.

(21) Appl. No.: 13/308,897

(22) Filed: Dec. 1, 2011

(65) Prior Publication Data

US 2012/0149811 A1 Jun. 14, 2012

Related U.S. Application Data

(60) Provisional application No. 61/418,971, filed on Dec. 2, 2010.

(51) Int. Cl.
| | | |
|---|---|---|
| C08K 3/22 | (2006.01) | |
| C08K 3/32 | (2006.01) | |
| C08K 3/40 | (2006.01) | |
| C08L 57/08 | (2006.01) | |
| C08L 27/06 | (2006.01) | |

(52) U.S. Cl.
USPC ......... 524/295; 524/296; 524/567; 525/331.5

(58) Field of Classification Search
USPC ............. 524/34, 35, 733, 296, 295, 567, 569; 525/331.5
See application file for complete search history.

(56) References Cited

U.S. PATENT DOCUMENTS

| | | | |
|---|---|---|---|
| 5,322,647 A | 6/1994 | Reiche et al. | |
| 5,385,978 A | 1/1995 | Evans et al. | |
| 5,888,626 A | 3/1999 | Sensenig | |
| 6,214,450 B1 | 4/2001 | Wickert et al. | |
| 6,531,223 B1 | 3/2003 | Rota et al. | |
| 2003/0119948 A1 | 6/2003 | Kelly et al. | |
| 2005/0214555 A1 | 9/2005 | Ahuwalia | |
| 2005/0272846 A1* | 12/2005 | Price et al. ............. | 524/439 |
| 2006/0030656 A1 | 2/2006 | Tarng et al. | |
| 2006/0063860 A1* | 3/2006 | Savin .................. | 523/219 |
| 2007/0105985 A1 | 5/2007 | Gillette et al. | |
| 2007/0221097 A1 | 9/2007 | Tarng et al. | |
| 2008/0054230 A1 | 3/2008 | Mabey et al. | |
| 2009/0130430 A1 | 5/2009 | Hugo | |

FOREIGN PATENT DOCUMENTS

| | | | |
|---|---|---|---|
| EP | 0238057 A3 | | 1/1990 |
| EP | 1505127 A1 | | 2/2005 |
| EP | 1829935 | * | 2/2007 |
| WO | 0170890 A1 | | 9/2001 |
| WO | 2006058782 A1 | | 6/2006 |
| WO | 2010002934 A2 | | 1/2010 |

OTHER PUBLICATIONS

Translation of EP1829935 no date.*
PCT International Search Report, Mar. 6, 2012.
PCT Written Opinion of the International Searching Authority, Mar. 6, 2012.
Philip J. Wakelyn, Noelie R. Bertoniere, Alfred D. French, Devron P. Thibodeaux, Barbara A Triplett, Marie-Alice Rousselle, Wilton R. Goynes, Jr., J. Vincent Edwards, Lawrance Hunter, David D. McAlister, and Gary R. Gamble, "Cotton Fibers", 2006, Taylor & Francis Group, LLC.
BYK Additives & Instruments, Liquid Rheology Additives for Aqueous Coatings and Pigment Concentrates, Feb. 2010.
International Fiber Corporation, Cotton Flock, Date Unknown.
3M, Glass Bubbles, Product Information, Sep. 2007.
Unknown, Product Overview—RF Fiber, Date Unknown.
"RF Fiber and Vapor Suppressant Factor", Impact Composite Technology, LTD., Date Unknown.
"Chemical/Physical Reactions of Renfil™ With Unsaturated Poly Ester Resins During Polymerization", Impact Composite Technology LTD., Date Unknown.
Sreekala G. Bajwa, Dilpreet S. Bajwa, Greg Holt, "Optimal Substitution of Cotton Burr and Linters in Thermoplastic Composistes", Forest Products Journal, 2009, vol. 59, No. 10, Forest Products Society, Madison, WI.
C.P. Gonzalez, P.I.C. Almenara, R.S. Camacho, B.P. Landa, F.H. Olivares, "Short Cut Glass Yarn Reinforced Coatings for Building Applications", Informes de la Construccion, Mar. 2003, p. 35-44, vol. 54, No. 484, Madrid, Spain.
Xiaojun Wang, D.D.L. Chung, "Short Carbon Fiber Reinforced Epoxy Coating as a Piezoresistive Strain Sensor for Cement Mortar", Sensors and Actuators A (Physical), Dec. 1, 1998, p. 208-212, vol. A71, No. 3, Elsevier.

* cited by examiner

Primary Examiner — James J Seidleck
Assistant Examiner — Deve E Valdez
(74) Attorney, Agent, or Firm — Eryn Ace Fuhrer; Robert E. McDonald; Daniel A. Sherwin

(57) ABSTRACT

An architectural paint is disclosed which comprises a film-forming binder polymer, cotton fibers, and glass bubbles. The paint, in some embodiments, is capable of covering defects in a wall surface.

8 Claims, 1 Drawing Sheet

FIG. 1
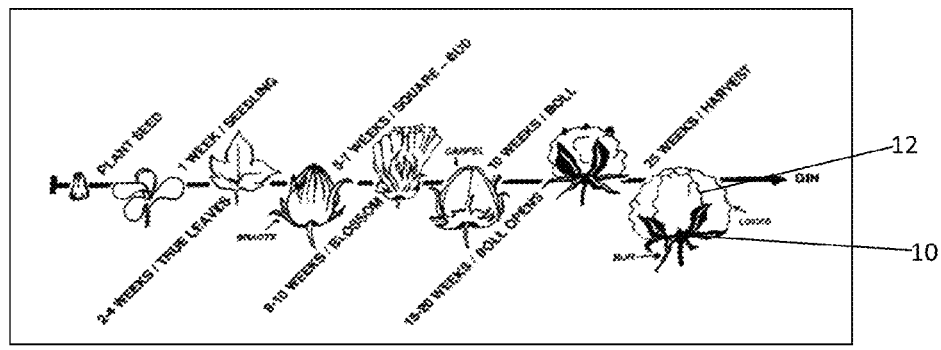
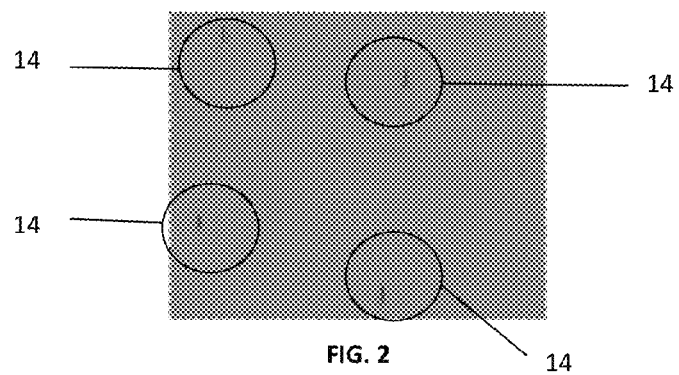
FIG. 2
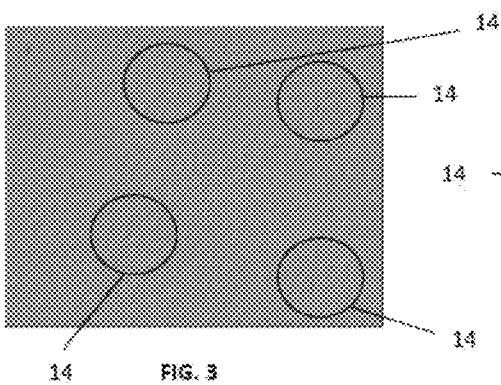
FIG. 3
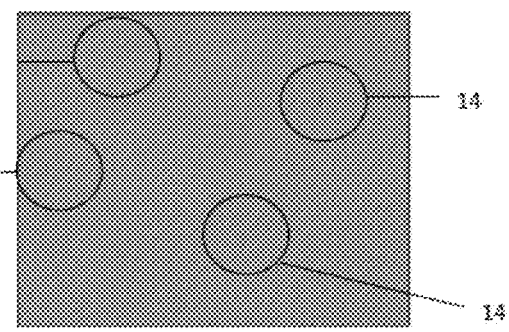
FIG. 4
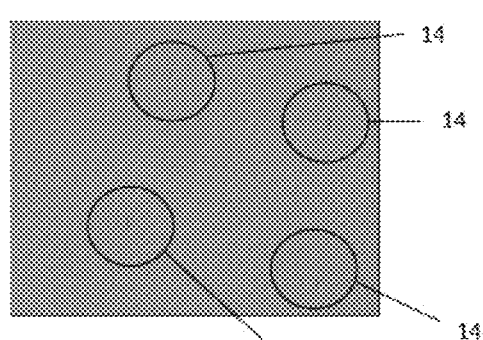
FIG. 5
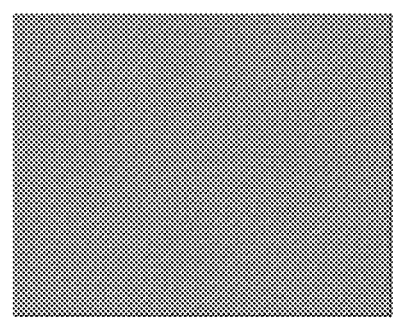
FIG. 6

ARCHITECTURAL PAINT FOR COVERING DEFECTS

CROSS REFERENCE TO RELATED APPLICATION

This application claims priority to U.S. Provisional Application Ser. No. 61/418,971 filed Dec. 2, 2010, the entirety of which is hereby incorporated by reference.

FIELD OF THE INVENTION

The present invention relates to an architectural paint, which is capable of covering a variety of defects in a surface. In particular, the invention relates to a latex paint which comprises a combination of cotton byproducts and glass bubbles in order to fill and/or bridge defects in a surface with the paint film.

BACKGROUND OF THE INVENTION

Latex paints are commonly used in architectural applications to provide a decorative appearance to walls and other surfaces. Latex paints do not usually cover or hide defects or imperfections, such as gouges or small nail holes, in a wall's surface. Rather such defects must be repaired by other means prior to painting the surface. The present invention provides a paint which is capable of covering and/or hiding defects or imperfections in the surface of a wall.

SUMMARY OF THE INVENTION

The present invention is directed to an architectural coating composition comprising a latex polymer, water, cotton byproducts, and glass bubbles. The architectural coating composition may also comprise one or more of the following: pigment, dispersant, defoamer, preservative, anti-settling agents, coalescing agent, biocide, humectant, buffer, colorant, or other components useful in architectural paints. The paint is, in some embodiments, capable of covering defects or imperfections in surface.

BRIEF DESCRIPTION OF THE DRAWINGS

FIG. 1 is an illustration of a cotton plant.
FIG. 2 shows a section of primed drywall with defects.
FIG. 3 shows a section of primed drywall with defects coated with paint that does not include cotton by products or glass bubbles.
FIG. 4 shows a section of primed drywall with defects coated with paint containing cotton linters.
FIG. 5 shows a section of primed drywall with defects coated with paint containing glass bubbles.
FIG. 6 shows a section of primed drywall with defects coated with paint in accordance with the present invention.

DETAILED DESCRIPTION OF THE INVENTION

Waterborne architectural coatings in accordance with the present invention comprise water, a polymer as a film-former (also referred to as binder), cotton by products, and glass bubbles.

The binder polymer of the present invention may be selected from any film forming polymer useful in coatings applications as are known or which may become known to those skilled in the art. In one useful embodiment of the present invention, the binder is a latex polymer emulsion. Conventional latex emulsions include those prepared by polymerizing at least one ethylenically unsaturated monomer in water using surfactants and water soluble initiators. Typical ethylenically unsaturated monomers include vinyl monomers, acrylic monomers, allylic monomers, acrylamide monomers and mono- and dicarboxylic unsaturated acids. Vinyl esters include vinyl acetate, vinyl propionate, vinyl butyrates, vinyl isopropyl acetates, vinyl neodeconate and similar vinyl esters; vinyl halides include vinyl chloride, vinyl fluoride and vinylidene chloride; vinyl aromatic hydrocarbons include styrene, α-methyl styrene, and similar lower alkyl styrenes. Acrylic monomers include monomers such as lower alkyl esters of acrylic or methacrylic acid having an alkyl ester portion containing between 1 to 12 carbon atoms as well as aromatic derivatives or acrylic and methacrylic acid. Useful acrylic monomers include, for example, acrylic and methacrylic acid, methyl acrylate, and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, and benzyl acrylate and methacrylate.

Preparation of latex compositions is well-known in the paint and coatings art. Any of the well-known free-radical emulsion polymerization techniques used to formulate latex polymer can be used in the present invention. Polymerization techniques suitable for preparing polymers useful in the present invention are taught in U.S. Pat. No. 5,486,576, which is hereby incorporated by reference.

The paint of the present invention further comprises cotton fibers or cotton byproducts including but not limited to cotton burr fibers, cotton flock fibers, and cotton linters.

Referring now to FIG. 1, the cotton burr or boll 10 is the bud leaf portion of the cotton plant. Cotton "fibers" 12 are unicellular hairs that grow out from the surface of the cotton seeds.

Cotton burr fibers are lignan cellulosic fibers produced from the cotton burr after the fibers have been removed. The cotton burr fibers are usually a tan or brown color. Various types of cotton burr fibers are commercially available, such as RF Fibers available from Impact Composite Technologies, Ltd.

Cotton lint is comprised of the relatively long fibers on the cotton seed. Cotton flock is made from cotton lint in a process which reduces the length of the cotton fibers. Such fibers may be used as is, or may be dyed or bleached to a desired color.

Cotton linters, are short fiber residues which are left on the cottonseed after the longer stable lint fibers are removed by ginning. Linters are shorter, thicker, and more colored fibers than lint. They also adhere more strongly to the cotton burr relative to the lint. Cotton linters also adhere to the cotton seeds in the cotton plant. Raw cotton linters are the linters which have not been subjected to chemical cleaning steps which are typically performed to yield high purity furnish. Raw cotton linters are removed from the cotton burr and cottonseeds using a number of technologies, including lint saws, abrasive grinding methods, and treatment with chemicals. The amount of hemicellulose, lignin, colored impurities and foreign matter in the various types of cotton linters increases with the number of passes or "cuts" used in removing linter from the cottonseed. First cut linters typically contain the least amount of impurities and foreign matter and subsequent cuts contain more impurities and foreign matter. In some cases, cotton seeds are treated with acid to remove linters from the seed. Linters obtained by this process are referred to as "acid linters." Cotton linters may be further processed such as by bleaching to produce white fibers.

In one useful embodiment, the cotton fibers used in the paint have an average size of about 10 to about 200 microns.

In one useful embodiment, the paint composition of the present invention comprises about 0.3% to about 4% by weight cotton by products.

The present invention further comprises glass bubbles. Glass bubbles are hollow glass spheres. In one useful embodiment, the glass bubbles may be formed from a soda-lime-borosilicate glass composition. Useful glass bubbles include those having a crush strength of about 500 to about 20,000 psi. For spray applications, the glass bubbles preferably have a crush strength of at least about 3000 psi. Various types of glass bubbles are commercially available such as K Series and S Series glass bubbles available form 3M and Sphericel glass bubbles available from Potters Industries.

In one useful embodiment, the paint composition of the present invention comprises about 1.7% to about 8% by weight glass bubbles.

Paints in accordance with the present invention may be made by manufacturing methods generally known to those of ordinary skill in the art. The cotton fibers and glass bubbles may be post added to an already prepared paint composition or may be added at various stages during the paint manufacturing process as described below.

Paints made in accordance with the present invention may also comprise other common paint additives, including but not limited to pigments, thickeners, dispersants, surfactants, anti-settling agents, biocides/preservatives, coalescing agents, plasticizers, stabilizers, viscosifiers, leveling aids, defoamers, anti-skinning agents, extenders, crosslinkers, corrosion inhibitors, matting agents, etc. Exemplary pigments include titanium dioxide, calcium carbonate, diatomaceous earth, mica, hydrated aluminum oxide, barium sulfate, calcium silicate, clay, silica, talc, zinc oxide, aluminum silicate, nepheline syenite, and mixtures thereof. For colored coatings, desired colorants are added to the waterborne coatings. The colored species may be selected from any known colorants, such as metallic oxides or synthetic organic pigments. Carbon black may also be used as a colorant in some embodiments.

The coating composition of the present invention is manufactured using techniques known to those skilled in the art of manufacturing paint. Generally, for a waterborne composition, there are four stages in the manufacturing process: a pre-thin stage, a grind stage, a wash stage and a thindown stage.

In the pre-thin stage, the binder resin(s) is/are delivered to a thindown tank, along with defoamer and chase water. Typically, a primary binder resin and one or more secondary binder resins are used. The primary binder resin is present in a significantly greater amount than the secondary binder resins and is the primary source of formula adhesion. Examples of resins useful as the primary binder resin include acrylic latexes, vinyl acrylic latexes, ethylene vinyl acetate latexes and other resins known to those of ordinary skill in the art. The secondary binder resin(s) are present in much smaller volumes and are generally added to further enhance coating properties. Useful secondary binder resin(s) include, but are not limited to small particle size acrylic latexes. The binder resin(s), the chase water and defoamer are mixed together in the thindown tank under low shear conditions to form a pre-thin mixture.

In the grind stage, the pigments, such as calcium carbonate and dry titanium dioxide, as well as and any other dry raw materials that would not homogenize under low-shear mixing, are dispersed in a mill under high shear conditions into a vehicle comprising water and one or more dispersant(s), which may be anionic and/or nonionic. As is known in the art, nonionic dispersants are protective colloids that contain a hydrophilic group, such as polyethylenoxide, and a hydrophobic group, such as a hydrocarbon chain. Also, as is known in the art, anionic dispersants include low molecular weight molecules like amine alcohols (such as aminomethyl propanol), phosphate salts (such as tetrapotassiumpyrophosphate) and polymeric compositions of polycarboxylic acid or polycarboxylic acid copolymers. The process of dispersing breaks up agglomerates of particles to form a better particle distribution, and wets the particles with the vehicle. Such wetting inhibits the reagglomeration of the pigment particles. Examples of useful commercially available dispersants include TAMOL™ 165A from Rohm & Haas and AMP-95 from Dow. In one useful embodiment, the cotton fibers are incorporated into the paint at this stage of the manufacturing process. In another embodiment, glass bubbles may be incorporated into this stage as well. Glass bubbles incorporated at this stage desirably have a sufficiently high crush strength, such as at least 3000 psi, to withstand the high shear mixing.

In the wash stage, water is pumped into the mill to clean the mill and chase the grind paste into the thindown tank.

In the thindown stage, the grind paste, the chase water and the pre-thin mixture are blended together in the thindown tank under low shear conditions. Additional components may also be added, such as thickeners, coalescing aids, anti-settling agents, biocides, anti-foaming agents, freeze-thaw additives, colorants and the like. Flow control agents may also be added to control the flow and leveling properties of the composition. Such additional components are generally known to those of ordinary skill in the art and generally commercially available. For example, such additional components may include, but are not limited to additives such as non-ionic urethane rheology modifiers, such as ACRYSOL™ RM rheology modifiers from DOW as thickeners; modified ureas, such as BYK 420 from Byk USA, or synthetic layered silicates, such as Laponite RD from Rockwood Additives Limited, as anti-settling agents; silicone or mineral oil type defoamers, glycols as freeze-thaw additives, or phthalocyanaine or iron oxide dispersions as colorants. Various types of these additives are commercially available. Other commercially available additives include butyl carbitol, and BIT-1,2-benzisothiazolin-3-one. Once prepared, the coating composition concentrate is further let down with reducing solvent, water, and generally a small amount of coalescing solvent. In one useful embodiment, the glass bubbles are added to this stage of the manufacturing process.

It should be appreciated that the present invention is not limited in any manner to the foregoing method of manufacturing the coating composition. Other manufacturing methods may be used. For example, a continuous paint manufacturing method utilizing component slurries may be used to manufacture the coating composition of the present invention.

In one useful embodiment of the present invention, the coating composition is a "flat," "eg-shel," or "semi-gloss" waterborne architectural paint composition.

The present invention will be better understood by reference to the following examples, which are provided for purposes of illustration only and are not to be construed as limiting the scope of the present invention.

Example 1

A flat latex paint in accordance with the present invention was prepared by mixing the following:

| Component | Parts by weight |
| --- | --- |
| Acrylic Latex[1] | 39.45 |
| Mineral Oil Defoamer[2] | 0.44 |
| Water | 13.92 |
| 2-(2-Butoxyethoxy) ethanol | 1.57 |
| Silicone Defoamer[3] | 0.21 |
| 1,2-Benzisothiazolin-3-one (BIT) | 0.05 |
| Hydrophobic Copolymer Pigment Dispersant[4] | 0.67 |
| 2-amino-2-methyl-1-propanol | 0.55 |
| Phosphate Ester Surfactant[5] | 0.22 |
| Dry TiO2 | 27.20 |
| Calcium carbonate | 4.71 |
| Cotton Flock Fiber - 150 mesh | 2.62 |
| Hollow Glass Microspheres[6] | 7.8 |
| Anti-Sag Additive[7] | 0.22 |
| Non-ionic Urethane Rheology Modifier[8] | 0.16 |
| Non-ionic Urethane Rheology Modifier[9] | 0.22 |

[1]RHOPLEX ™ SG-10M acrylic emulsion from Dow
[2]Proprietary defoamer from Sherwin-Williams
[3]BYK 021 defoamer from Byk USA
[4]TAMOL 165A dispersant from Dow
[5]STRODEX PK90 surfactant from Aqualon
[6]K37 Glass bubbles from 3M
[7]BYK 420 rheological additive from Byk USA
[8]ACRYSOL RM-825 rheological additive from Dow
[9]ACRYSOL RM-2020 NPR rheological additive from Dow An eg-shel latex paint was prepared by mixing the following:

| Component | Parts by weight |
| --- | --- |
| RHOPLEX ™ SG-10M acrylic emulsion | 50.68 |
| Proprietary mineral oil defoamer from Sherwin-Williams | 0.40 |
| Water | 12.55 |
| 2-(2-Butoxyethoxy) ethanol | 1.42 |
| BYK 021 defoamer | 0.19 |
| 1,2-Benzisothiazolin-3-one (BIT) | 0.05 |
| TAMOL 165A dispersant | 0.6 |
| 2-amino-2-methyl-1-propanol | 0.5 |
| STRODEX PK90 surfactant | 0.2 |
| Dry TiO2 | 24.53 |
| Calcium carbonate | 4.25 |
| Cotton Flock Fiber - 150 mesh | 2.36 |
| K37 glass bubbles | 1.75 |
| BYK 420 additive | 0.2 |
| ACRYSOL RM-825 additive | 0.14 |
| ACRYSOL RM-2020 additive | 0.2 |

It has been observed that paints made in accordance with the present invention, namely, latex paints incorporating both cotton fibers and glass bubbles, are able to cover defects in a surface, such as drywall. The paint may be applied to the surface by brush, roller, or spray application methods. As shown in FIGS. 2-6, primed drywall was gouged with a taping knife to create defects 14. Drywall segments with such defects were coated by roller applicator with paint with neither cotton by products or glass bubbles (FIG. 3), paint with cotton by products only (FIG. 4), paint with glass bubbles only (FIG. 5), and paint containing both cotton byproducts and glass bubbles in accordance with the present invention. The defects 14 in the drywall are still visible in FIGS. 3-5, illustrating that those paints provided poor coverage of the defects. However, defects do not appear to be visible in FIG. 6 illustrating that paint containing both glass bubbles and cotton by products provides superior coverage and hiding of defects.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. A paint comprising:
a film-forming latex binder polymer;
water;
pigment;
cotton fibers, selected from cotton burr fibers and cotton flock fibers; and
glass bubbles.

2. The paint of claim 1, wherein the cotton fibers have a an average size of about 10 to about 200 microns.

3. The paint of claim 1, wherein the glass bubbles have a crush strength of about 500 psi to about 20,000 psi.

4. The paint of claim 1, wherein the glass bubbles have a crush strength of about 3000 psi.

5. The paint of claim 1, wherein the paint comprises about 0.3% to about 4% by weight cotton fibers.

6. The paint of claim 1, wherein the paint comprises about 1.7% to about 8% by weight glass bubbles.

7. The paint of claim 1, further comprising an anti-settling agent.

8. The paint of claim 1, further comprising a colored pigment.

* * * * *

UNITED STATES PATENT AND TRADEMARK OFFICE
CERTIFICATE OF CORRECTION

PATENT NO.        : 8,785,533 B2
APPLICATION NO.   : 13/308897
DATED             : July 22, 2014
INVENTOR(S)       : Richard Randall Chamberlain and Rasna Batra Page 1 of 1

It is certified that error appears in the above-identified patent and that said Letters Patent is hereby corrected as shown below:

In the Specification

Column 4, Line 57, delete "eg-shel", and insert --egg-shell--.

Column 5, Line 26, delete "eg-shel", and insert --egg-shell--.

Signed and Sealed this
Nineteenth Day of May, 2015

Michelle K. Lee
*Director of the United States Patent and Trademark Office*